March 20, 1951   E. RICHTER   2,545,493
HYDRAULIC LEVELING APPARATUS FOR MOTOR VEHICLES
Filed March 1, 1946   2 Sheets-Sheet 2
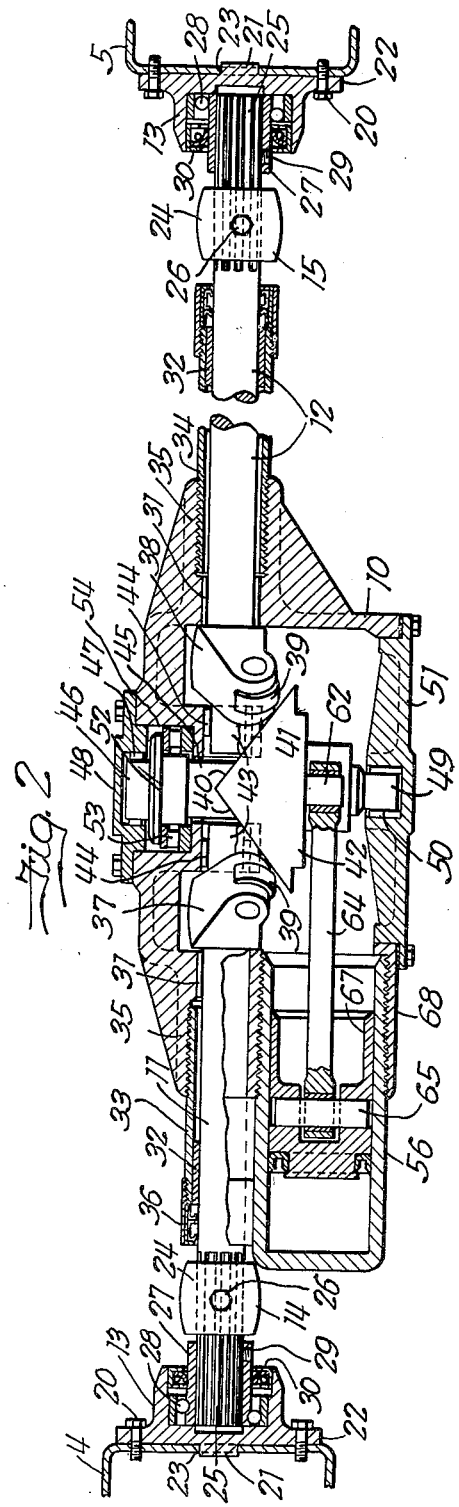
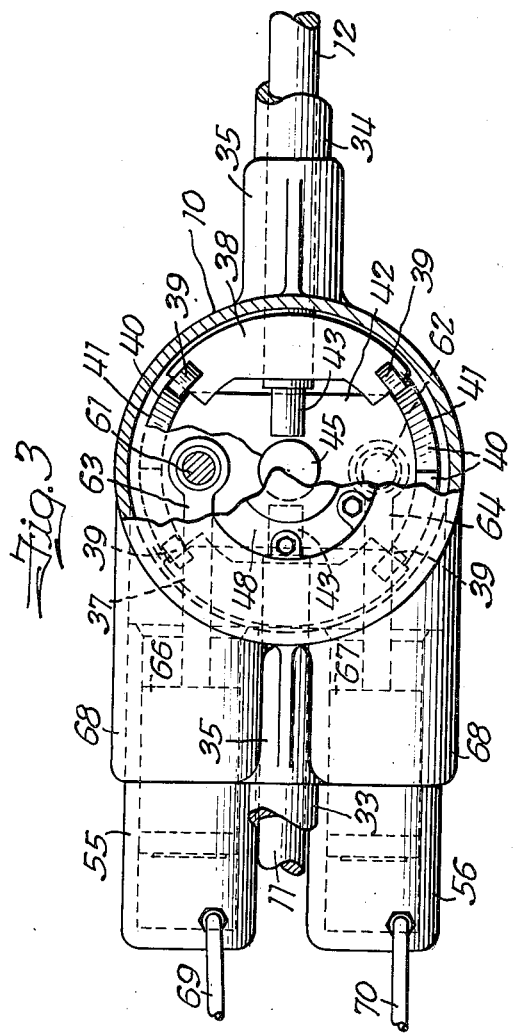
Inventor
Edward Richter
Andrew F. Wintercorn
atty.

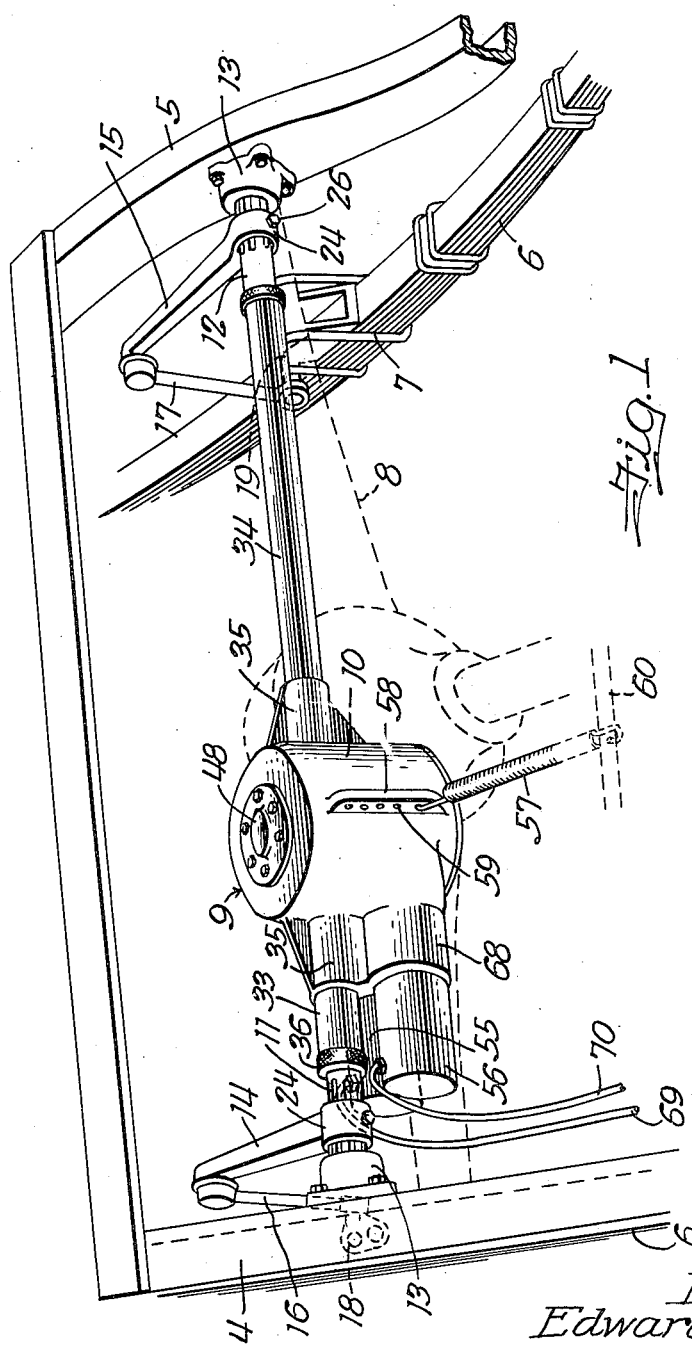

Patented Mar. 20, 1951

2,545,493

UNITED STATES PATENT OFFICE 2,545,493

HYDRAULIC LEVELING APPARATUS FOR MOTOR VEHICLES

Edward Richter, Freeport, Ill.

Application March 1, 1946, Serial No. 651,363

30 Claims. (Cl. 280—6)

The disclosure of the present application is related to that of a copending application, Serial No. 26,756, filed May 13, 1948.

This invention relates to leveling apparatus for motor vehicles and, although the present apparatus was designed for use in connection with side-service hearses to level the bodies thereof to secure proper disposition of the casket table in loading and unloading the casket, it will be seen that that is only one of many possible applications, the invention being applicable to taxi-cabs and automobiles generally and, in fact, any vehicles having spring suspension.

In my earlier Patent 2,148,504, I disclosed what might be called a "built-in" leveling apparatus because of the fact that the working cylinders are assembled on the vehicle frame in rigid relation thereto. Such installations are necessarily expensive and it is also a problem to apply such apparatuses to some cars, and in a number of instances, it is not at all practical to do so. It is, therefore, the principal object of my invention to provide a simpler and more economical leveling apparatus and one that is far more compact in construction and is of unitary design and adapted for substantially universal application to cars of different makes.

A salient feature of the leveling apparatus of my invention consists in the arrangement of two shafts disposed in coaxial relation and extending from opposite sides of a leveler housing crosswise of the vehicle frame and substantially in parallel relation to the rear axle housing, these shafts being suitably supported at their outer ends in bearings provided therefor on the frame and being rotatable in opposite directions by hydraulic means in the leveler housing to positively lift one side and positively lower the other side of the vehicle frame relative to the rear axle housing, the two shafts being connected by levers and links to the spring shackles adjacent the rear axle housing to secure the leveling movement. With this novel unit, therefore, there is only the mounting of bearings on the opposite sides of the frame and the connection of the links to the spring shackles to complete any installation, these few simple operations taking only a small fraction of the time required to install a so-called "built-in" type of apparatus, besides avoiding the other objections previously mentioned.

Another important feature of this leveling apparatus is the fact that the leveler housing and the hydraulic means therein are in floating relation to the two operating shafts while the car is running, so that the leveling apparatus is substantially completely divorced from and does not interfere with the normal functioning of the vehicle spring suspension, but is, nevertheless, always operatively associated with the spring suspension to be put to use instantly whenever desired.

Still another important feature of the levelling apparatus of my invention is the differential action of the mechanism interconnecting the two shafts so that the torque is transmitted first to whichever shaft exerts the lesser resistance to turning, until the resistance to turning is equalized between the two shafts, after which the torque is applied to both shafts alike, thus distributing the strains evenly between the two shafts in levelling the vehicle, this differential action being obtained by virtue of the floating relationship of the leveler housing to the two shafts.

Another important feature is the provision of spring means tending to return the floating leveler housing to a neutral position after a levelling operation, thus assisting the action of the vehicle springs and insuring prompt return of the pistons and the cam operated thereby to neutral position.

The leveling apparatus of my invention is, furthermore, so designed that all of the working parts operate in an oil bath in the leveler housing so that there will be little or no wear, and a unit, once properly installed, should never require any attention for the life of the vehicle. The bearings that are applied to the frame to mount the two shafts are likewise packed with lubricant, and in view of the small amount of operation of the shafts, these bearings should never require any attention during the life of the car.

The invention is illustrated in the accompanying drawings, in which

Fig. 1 is a perspective view showing a leveling unit made in accordance with my invention applied to the chassis of a motor vehicle;

Fig. 2 is a longitudinal section through the unit in a vertical plane, and

Fig. 3 is a top view of the leveler housing, certain portions of which have been broken away for purposes of better illustration.

The same reference numerals are applied to corresponding parts throughout the views.

Referring to Fig. 1, the reference numerals 4 and 5 designate the opposite side members of the vehicle frame that are connected in the usual way to springs 6 secured by means of the usual shackles 7 to a rear axle housing indicated in dotted lines at 8. The leveling unit of my invention is indicated generally by the reference numeral 9, 10 being the leveler housing, and 11 and 12 the two operating shafts coaxially arranged and extending from opposite sides of said housing crosswise of the frame and in substantially parallel relation to the rear axle housing 8 and mounted at their outer ends in bearings 13 detachably secured to the opposite sides of the frame. The shafts 11 and 12 are arranged to be turned in opposite directions by hydraulic means in the housing 10 to raise one side of the frame positively and at the same time positively lower the other side of the frame relative to the rear axle housing 8, the arms 14 and 15 being attached to the shafts 11 and 12, respectively, and pivotally connected at their outer ends to the upper ends of links 16 and 17, whose lower ends are in turn pivotally connected to brackets 18 and 19 that are suitably secured to the spring shackles, whereby to give the leveling movement. Thus, for example, if the shafts 11 and 12 are turned so as to raise the arm 14 and lower the arm 15, the side 4 of the frame will be lowered and the side 5 raised, and vice versa. From this brief description, it should be apparent that the unit 9, not being of the "built-in" type, but rather of what may be called an attachment type, can be installed in a small fraction of the time required to install a "built-in" type, there being only the bearings 13 to mount on the opposite sides of the frame and the brackets 18 and 19 to apply to the spring shackles. Incidentally, the bearings 13 are preferably fastened by means of screws 20 to the webs of the channel iron frame members 4 and 5 and have integral bosses 21 projecting from the center of their attaching portions 22 and fitting closely in holes 23 made therefor in the webs of the channel iron frame members so that the loads incident to leveling and incident to the support of the unit otherwise are assumed by these bosses 21 and not by the screws 20, the screws serving merely to hold the bearings in place in abutment with the frame members. The hubs 24 on the inner ends of the levers 14 and 15 are splined for a slidable spline connection with the splined outer ends 25 of the shafts 11 and 12, and there are set screws 26 in the hubs 24 which, when tightened, hold the levers 14 and 15 against sidewise movement from a desired adjusted position. Inner race members 27 for the ball bearings 28, provided as a part of the bearings 13, are splined to fit the splined outer ends 25 of the shafts 11 and 12 and are fastened to the shafts by set screws 29 to prevent endwise movement relative to the shafts from a desired adjusted position. Each bearing 13 has a lubricant retainer 30 so that when the bearings have been packed with lubricant, they should not require attention throughout the life of the car.

The leveler housing 10 is supported in floating relation to the vehicle frame on the inner end portions of the shafts 11 and 12 by means of spaced bearings 31 and 32, the outer bearings 32 closest to the frame members 4 and 5 being provided in the outer ends of tubes 33 and 34 which are threaded in bosses 35 provided on the opposite sides of the housing 10. Caps 36 threaded on the outer ends of the tubes 33 and 34 contain lubricant retainers to minimize loss of lubricant from the housing 10 along the shafts. Crossheads 37 and 38 are suitably fixedly mounted on the inner ends of the shafts 11 and 12, respectively, and are of arcuate form, as clearly appears in Fig. 3, and are struck on arcs with the same center as the cylindrical housing 10 and are disposed in spaced substantially concentric relation to the inside of said housing. Rollers 39 are mounted in the opposite ends of the cross-heads for anti-friction rolling contact with the inclined faces 40 provided on the V-shaped opposite end portions 41 of a crosshead form of cylindrical cam 42 that is usually referred to hereinafter in the specification and claims as a "cam" but also as a "cam-shaped cross-head," the same being arranged to be oscillated in either direction from the neutral position illustrated in Figs. 2 and 3, whereby to oscillate the cross-heads 37 and 38 in opposite directions, and accordingly, turn the shafts 11 and 12 for a leveling movement of the vehicle frame relative to the rear axle housing. The shafts 11 and 12 have pilot inner end portions 43 received in bearings 44 that are radially inwardly spaced in the housing 10 relative to the bearings 31 previously mentioned, whereby to eliminate objectionable deflection of the end portions of the shafts under the leveling loads imposed upon the cross-heads in the operation of the cam 42. The cam 42 is fixed on one end portion of a shaft 45 that is centrally disposed in the housing 10, one end portion 46 being mounted in a roller bearing 47 provided therefor in a closure cap 48, and the other end 49 being mounted in another roller bearing 50 provided in the center of a cover plate 51. The bearings 47 and 50 assume the radial loads incident to the operation of the cam 42 in leveling the vehicle, and there is an annular flange 52 provided on the end 46 which rests on a thrust bearing 53 to assume end thrust of the shaft incident to leveling. The one end wall of the housing 10 is provided with a suitable recess 54 to accommodate the flange 52 and thrust bearing 53 and this recess is closed by the cap 48. The lubricant with which the housing 10 is suitably filled will provide adequate lubrication indefinitely for the bearings 47, 50 and 53, and also lubricate the cam 42 and the rollers 39 on the cross-heads, and it is therefore unlikely that this operating mechanism will ever require any attention throughout the life of the car. The opposite end portions 41 of the cam 42, in the middle or neutral position of the cam illustrated in Figs. 2 and 3, have their faces 40 spaced sufficiently in relation to the rollers 39 on the cross-heads 37 and 38 so that the shafts 11 and 12 can turn freely through the small angularity necessary to avoid interference with the proper functioning of the spring suspension in the running of the car. However, in the event either of the springs 6 is subjected to an unusual amount of deflection, as when the wheel on that side of the car drops into a depression or rides over a bump in the road, the cross-head 37 or 38, as the case may be, striking the cam 42 will merely cause a slight turn of the leveler housing 10, and only in a very extreme case would the aggregate clearance be taken up. The yielding restraint exerted on the vehicle springs by the leveling unit is found to reduce appreciably the objectionable side sway of the vehicle body in making sharp turns at high speeds. The housing 10 normally gravitates pendulum-like to the position shown in Figs. 1 and 2 with the shaft 45 substantially vertical, the greatest weight being concentrated in the housing 10 below the aligned centers of the shafts 11 and 12, because of the cam 42 and the cylinders 55 and 56 to which reference will be made presently. A coiled tension spring 57 is preferably provided to assist in bringing the leveler housing 10 promptly back to its normal position after a momentary deflection in the run of the vehicle also after a leveling operation when the vehicle is stationary, this spring being connected at one end to a rib 58 on the housing 10 in any one of a plurality of vertically spaced holes 59 provided in said rib, and the other end being suitably attached to an adjacent fixed portion 60 of the vehicle frame. The elevation of the point of attachment 60 will determine how high or how low to attach the other end of the spring 57, the aim being to cause an increase in the tension of the spring 57 upon deflection of the housing 10 in either direction from a normal substantially vertical position, so that the spring 57 will serve to return the housing to normal position promptly after a deflection. The housing 10 and spring 57 are both spaced laterally from the propeller shaft of the car, as clearly appears in Fig. 1, so that there will be no danger of the shaft striking either of these parts at any time. The housing 10 is also spaced forwardly sufficiently relative to the rear axle housing 8 so that there is always ample operating clearance between these parts.

It will be evident that the cam 42 can be turned by any suitable means. However, I prefer to use hydraulic means as herein disclosed because of its flexibility and relative simplicity and economy. Thus the cam 42 has diametrically opposed crank pins 61 and 62 to which the outer ends of piston rods 63 and 64 are connected, these rods being attached to the wrist pins 65 of pistons 66 and 67 working in the cylinders 55 and 56. These cylinders are threaded into bosses 68 provided on one side of the housing 10 below the boss 35. The inner ends of the cylinders are open to the inside of the housing 10 for free flow of lubricant therebetween, and inasmuch as the pistons 66 and 67 always move in opposite directions, it is clear that the housing 10 may be completely filled with lubricant if desired, without presenting any problem of displacement. The pistons 66 and 67 are preferably operated hydraulically, but they may be operated by vacuum from the intake manifold of the engine if that is preferred. Flexible tubes 69 and 70 are indicated connected to the tops of the cylinders 55 and 56 at their outer ends for the delivery of oil under pressure to one of said cylinders while oil is allowed to escape simultaneously from the other of said cylinders. Any suitable source of oil under pressure may be provided and any suitable control valve means for the delivery and discharge of oil to and from the cylinders, there being a disclosure of such means in my earlier Patent 2,148,504. The fact that the tubes 69 and 70 are connected to the tops of the working cylinders, reduces likelihood of any air pockets, it being important that the oil provide substantially non-yielding links or ties between the body and the rear axle housing to hold the body rigidly in adjusted relation to the rear axle housing. In leveling either way, the operator may rely upon his judgment as to when the car is leveled and stop the electric motor at the proper time.

In operation, when oil under pressure is delivered to either of the cylinders 55 and 56, the torque for leveling is transmitted through the cam 42 first to whichever of the two shafts 11 and 12 exerts the lesser resistance to turning, thus moving the arm 14 or 15, as the case may be, attached to that shaft at double the speed until the resistance to turning of the shafts is equalized, after which the two shafts will be turned at the same speed in opposite directions, until the vehicle levelling operation is completed, the strains incident to the levelling operation being accordingly evenly divided between the two shafts. The differential action, by virtue of which the torque is applied to whichever shaft exerts the lesser resistance to turning, is obtained as a result of the floating mounting of the leveler housing 10 relative to the two shafts 11 and 12. When the vehicle body is to be permitted to return to its normal position after a levelling operation and the operator has accordingly shifted the control lever to the neutral position, thus permitting escape of oil from the cylinder in which the piston has been actuated, the parts are returned to normal or neutral position, partly as a result of the recoil action of the vehicle springs and partly as a result of the action of the tension spring 57 attached to the housing 10. The cross-heads 37 and 38 provided on the inner end of the operating shafts 11 and 12 within the leveler housing 10 are normally in a predetermined spaced relationship at both ends to the opposite ends of the hydraulically operated cam 42 mounted for oscillation relative to the cross-heads in the leveler housing, and this arrangement permits a certain amount of free oscillation of the shafts 11 and 12 without interference by contact of either cross-head with the cam, but in the event of any unusual deflection of either spring, the leveler housing, being in floating relation to the shafts, will turn to whatever small extent may be necessary to compensate for the extreme condition.

It is believed the foregoing description conveys a good understanding of the objects and advantages of my invention. The appended claims have been drawn to cover all legitimate modifications and adaptations.

I claim:

1. In a vehicle, the combination of a wheeled structure, a frame, yieldable suspension means supporting said frame on said wheeled structure, shafts supported on opposite sides of said frame for rotation, one of which shafts is connected by an arm with the wheeled structure on one side of the frame and the other of which shafts is correspondingly connected by an arm on the other side of the frame to elevate one side while depressing the opposite side of the frame when the shafts are turned in opposite directions, a housing into which said shafts extend, and a single power operable means in said housing movable from a neutral position in which it is in disengaged relation to both shafts to engaged relation to both shafts to turn said shafts simultaneously in opposite directions to elevate one side of said frame and depress the other side relative to the wheeled structure, the shafts when in disengaged relation to said last named means being free to turn independently of said means.

2. In a vehicle, the combination of a wheeled structure, a frame, yieldable suspension means supporting said frame on said wheeled structure, shafts supported on opposite sides of said frame for rotation, one of which shafts is connected by an arm with the wheeled structure on one side of the frame and the other of which shafts is correspondingly connected by an arm on the other side of the frame to elevate one side while depressing the opposite side of the frame when the shafts are turned in opposite directions, a housing into which said shafts extend, and a single power operable means in said housing movable selectively in either direction from a neutral position in which it is in disengaged relation to both shafts, permitting a predetermined amount of turning of either of the shafts independently of the power operable means, to engaged relation to both shafts to turn said shafts simultaneously in opposite directions to elevate either side of said frame and depress the other side relative to the wheeled structure.

3. In a vehicle, the combination of a wheeled structure, a frame, yieldable suspension means supporting said frame on said wheeled structure, shafts supported on opposite sides of said frame for rotation, one of which shafts is connected by an arm with the wheeled structure on one side of the frame and the other of which shafts is correspondingly connected by an arm on the other side of the frame to elevate one side while depressing the opposite side of the frame when the shafts are turned in opposite directions, a housing into which said shafts extend, cross-heads on the inner ends of said shafts, and a single power operable oscillatable cam in said housing movable from a neutral position in which it is in disengaged relation to both crossheads to engaged relation to turn said shafts in opposite directions to elevate one side of said frame and depress the other side relative to the wheeled structure.

4. In a vehicle, the combination of a wheeled structure, a frame, yieldable suspension means supporting said frame on said wheeled structure, shafts supported on opposite side of said frame for rotation, one of which shafts is connected by an arm with the wheeled structure on one side of the frame and the other of which shafts is correspondingly connected by an arm on the other side of the frame to elevate one side while depressing the opposite side of the frame when the shafts are turned in opposite directions, said shafts being in coaxial relation, a housing into which said shafts extend for power operation, said housing being free to oscillate relative to said shafts, cross-heads fixed on the inner ends of said shafts and disposed in coaxially spaced relation on opposite sides of said housing, and a power operable cam shaped cross-head member disposed between the aforesaid cross-heads and arranged to turn in said housing on an axis in transverse relation to said shafts, said cam crosshead being movable from a neutral position in which it is in disengaged relation to the shaft crossheads to engaged relation to turn said shafts in opposite directions to elevate one side of said frame and depress the other side relative to the wheeled structure.

5. In a vehicle, the combination of a wheeled structure, a frame, yieldable suspension means supporting said frame on said wheeled structure, shafts supported on opposite sides of said frame for rotation, one of which shafts is connected by an arm with the wheel structure on one side of the frame and the other of which shafts is correspondingly connected by an arm on the other side of the frame to elevate one side while depressing the opposite side of the frame when the shafts are turned in opposite directions, said shafts being in coaxial relation, a housing into which said shafts extend for power operation, said housing being free to oscillate relative to said shafts, crossheads fixed on the inner ends of said shafts and disposed in coaxially spaced relation on opposite sides of said housing, a cam shaped crosshead member disposed between the aforesaid crossheads and arranged to turn in said housing on an axis in transverse relation to said shafts, said cam crosshead being movable from a neutral position in which it is in disengaged relation to the shaft crossheads to engaged relation to turn said shafts in opposite directions to elevate one side of said frame and depress the other side relative to the wheeled structure, and power operable means for turning said cam crosshead comprising a cylinder in fixed relation to and movable with said housing, and a piston working in said cylinder under fluid pressure and operatively connected with said cam crosshead.

6. In a vehicle, the combination of a wheeled structure, a frame, yieldable suspension means supporting said frame on said wheeled structure, shafts supported on opposite sides of said frame for rotation, one of which shafts is connected by an arm with the wheeled structure on one side of the frame and the other of which shafts is correspondingly connected by an arm on the other side of the frame to elevate one side while depressing the opposite side of the frame when the shafts are turned in opposite directions, said shafts being in coaxial relation, a housing into which said shafts extend for power operation, said housing being free to oscillate relative to said shafts, crossheads fixed on the inner ends of said shafts and disposed in coaxially spaced relation on opposite sides of said housing, a cam shaped crosshead member disposed between the aforesaid crossheads and arranged to turn in said housing on an axis in transverse relation to said shafts, said cam crosshead being movable from a neutral position in which it is in disengaged relation to the shaft crossheads to engaged relation to turn said shafts in opposite directions to elevate one side of said frame and depress the other side relative to the wheeled structure, two cylinders in fixed relation to said housing and movable therewith, and pistons working in said cylinders under fluid pressure and operatively connected with said cam crosshead on opposite sides of the axis of rotation thereof.

7. In a vehicle comprising an axle containing housing having a propeller shaft extending from the middle portion substantially in right angle relation thereto, a frame having opposed side portions, and yieldable suspension means for supporting said frame on said housing, levelling apparatus attachable to said frame and axle housing comprising coaxially arranged bearings detachably mounted on the opposite side portions of said frame, a long shaft and a short shaft mounted in said bearings and extending crosswise of said frame toward each other and in transverse and spaced relation to the propeller shaft, an arm attached to each shaft adjacent the side portions of the frame and operatively connected by links to said axle housing, a shaft housing into which the long and short shafts extend disposed in laterally spaced relation to said propeller shaft, said shaft housing being in rotatable floating relation to the shafts, means yieldingly restraining rotation of said shaft housing, and power operable means in said shaft housing for turning said shafts in opposite directions to elevate one side of said frame and depress the other side relative to said axle housing.

8. A structure as set forth in claim 7 wherein said shaft housing is so weighted that it tends to gravitate to a certain position, the means yieldingly restraining rotation of said shaft housing comprising spring means acting between said shaft housing and said frame yieldingly restraining rotation of said shaft housing from its gravity settled position and tending to return it to such position when moved from it.

9. In a vehicle comprising an axle containing housing, a frame having opposed side portions, tending into said housing through bearings in opposite sides thereof, crossheads fixed on the inner end portions of said shafts in said housing, pilot bearings in said housing in inwardly spaced coaxial relation to the first named bearings receiving pilot end portions provided on the inner end portions of said shafts inwardly from the crossheads, a cylindrical cam member mounted on a cross-shaft in said housing between said crossheads and having operative engagement with the outer ends of said crossheads, whereby to turn the shafts jointly in opposite directions, and power operable means for turning said cam member.

18. In a vehicle frame leveling apparatus, a hollow cylindrical housing, two coaxial shafts to be power oscillated extending from diametrically opposite sides of said housing in one plane, said shafts being connected at their outer ends to frame elevating and lowering means on opposite sides of said frame, crossheads of arcuate form on the inner ends of said shafts having rollers mounted on the opposite ends thereof, a cross-shaft received in bearings in the opposite ends of said housing carrying a diametrically extending cam member which has V-shaped ends arranged for operative engagement with the rollers on the ends of said crossheads, whereby to turn said shafts jointly in opposite directions, crank pins on said cam member, pistons connected by rods to said crank pins, and cylinders rigid with said housing and disposed in a plane spaced from the plane of said first named shafts and having said pistons working therein under fluid pressure.

19. A levelling attachment for a hearse or other spring supported vehicle comprising only two shafts with frame elevating and depressing connections, bearings for the shafts detachably connectible to the vehicle, and power operable means movable from a neutral position in disengaged relation to said shafts to an operative position in which it is differentially operatively connected with said shafts for turning said shafts differentially in opposite directions.

20. A levelling attachment for a hearse or other spring supported vehicle comprising only two shafts with frame elevating and depressing arms thereon, bearings for the shafts detachably connectible to the vehicle, said shafts being in coaxial relation, a housing in rotary floating relation to and rotatably supporting in coaxial relationship the adjoining ends of said shafts and containing fluid pressure operable means movable from a neutral position in disengaged relation to said shafts to an operative position in which it is differentially operatively connected with said shafts for turning said shafts differentially in opposite directions, and flexible pressure fluid conducting conduit means connected to said housing.

21. An apparatus as set forth in claim 18 wherein said housing has a longitudinally extending projection on one side thereof having longitudinally spaced holes provided therein into any one of which the end of a coiled tension spring for restraining rotary movement of said housing from a settled position is adapted to be connected.

22. An apparatus as set forth in claim 18 wherein said housing normally gravitates to a position in which the cross-shaft is substantially vertically disposed, the device including flexible tubes for conducting oil or the like under pressure into the outer end of either of said cylinders connected to what is normally the top side of said cylinders, substantially as and for the purpose described.

23. In a vehicle, the combination of a wheeled structure, a frame, yieldable suspension means supporting said frame on said wheeled structure, shafts supported on opposite sides of said frame for rotation, one of which shafts is connected by an arm with the wheeled structure on one side of the frame and the other of which shafts is correspondingly connected by an arm on the other side of the frame for elevating and depressing opposite sides of the frame, a housing into which said shafts extend, and power operable differential means in said housing movable from a neutral position in disengaged relation to said shafts to an operative position operatively associated with said shafts for turning said shafts in opposite directions to elevate one side of said frame and depress the other side relative to the wheeled structure.

24. In a vehicle, the combination of a wheeled structure, a frame, yieldable suspension means supporting said frame on said wheeled structure, shafts supported on opposite side of said frame for rotation, one of which shafts is connected by an arm with the wheeled structure on one side of the frame and the other of which shafts is correspondingly connected by an arm on the other side of the frame for elevating and depressing opposite sides of the frame, said shafts being coaxially arranged, a housing into which said shafts extend and which is in rotatable floating relation to said shafts, and power operable differential means in said housing movable from a neutral position in disengaged relation to said shafts to an operative position operatively associated with said shafts for turning said shafts in opposite directions to elevate one side of said frame and depress the other side relative to the wheeled structure.

25. A levelling attachment for a hearse or other spring supported vehicle comprising two shafts connected with frame elevating and depressing devices, bearings for the shafts detachably connectable to the vehicle, and a housing rotatably supporting in coaxial relationship the adjoining ends of said shafts and containing power operable differential means movable from a neutral position in disengaged relation to said shafts to an operative position for turning said shafts in opposite directions.

26. A levelling attachment for a hearse or other spring supported vehicle comprising two shafts connected with frame elevating and depressing devices, bearings for the shafts detachably connectable to the vehicle, said shafts being in coaxial relation, and a housing in rotary floating relation to and rotatably supporting in coaxial relationship the adjoining ends of said shafts and containing power operable differential means movable from a neutral position in disengaged relation to said shafts to an operative position for turning said shafts in opposite directions.

27. A structure as set forth in claim 3 wherein the housing is freely rotatable relative to said shafts as an axis and carries said power operable cam with it in such rotation so that a differential action is obtained in the power operation of said shafts for levelling.

28. A structure as set forth in claim 3 wherein the housing is freely rotatable relative to said shafts as an axis and carries said power operable cam with it in such rotation so that a differential action is obtained in the power operation of said shafts for levelling, said housing being unbalanced and tending to gravitate to a certain position in which the cam is in neutral position in the and yieldable suspension means for supporting said frame on said housing, levelling apparatus attachable to said frame and axle housing comprising bearings detachably mounted on the opposite side portions of said frame, shafts mounted in said bearings and extending crosswise of said frame toward each other, an arm attached to each shaft adjacent the side portions of the frame and operatively connected by links to said axle housing, and a power operable differential mechanical unit operatively associated with the inner ends of said shafts to turn the same simultaneously in opposite directions to elevate one side of said frame and depress the other side relative to said axle housing, said unit comprising power operable means for transmitting rotation to the inner ends of said shafts in opposite directions, and a freely revoluble housing having opposed bearings receiving the adjacent inner end portions of said shafts and adapted to contain lubricant for the joint lubrication of said bearings and the said power operable means enclosed in said housing.

10. In a vehicle comprising an axle containing housing, a frame having opposed side portions, and yieldable suspension means for supporting said frame on said housing, levelling apparatus attachable to said frame and axle housing comprising bearings detachably mounted on the opposite side portions of said frame, shafts mounted in said bearings and extending crosswise of said frame toward each other, an arm attached to each shaft adjacent the side portions of the frame and operatively connected by links to said axle housing, a differential mechanical unit operatively associated with the inner ends of said shafts to turn the same in opposite directions to elevate one side of said frame and depress the other side relative to said axle housing, said differential mechanical unit comprising power operable cam means for transmitting rotation in opposite directions to cross-heads on the inner ends of said shafts, a freely revoluble housing having opposed bearings receiving the adjacent inner end portions of said shafts and adapted to contain lubricant for the joint lubrication of said bearings and the said power operable cam means and cross-heads enclosed in said housing, oil cylinders on said shaft housing communicating with the inside thereof, and oil pressure operated pistons working in said cylinders and operatively connected with the aforesaid power operable cam means.

11. In a vehicle frame leveling apparatus, a housing, two shafts to be power oscillated extending from opposite sides of said housing to the opposite sides of said frame where they have connection with frame elevating and lowering means, cam follower arms on the inner ends of said shafts, a cylindrical cam member mounted on a cross-shaft in said housing between said arms and movable from a neutral position in disengaged spaced relation to said arms to an operative position having operative engagement with the outer ends of said arms, whereby to turn the shafts jointly in opposite directions, and power operable means for turning said cam member.

12. In a vehicle frame leveling apparatus, a housing, two shafts to be power oscillated extending from opposite sides of said housing to the opposite sides of said frame where they have connection with frame elevating and lowering means, cam follower arms on the inner ends of said shafts, a cylindrical cam member mounted on a cross-shaft in said housing between said arms and having operative engagement with the outer ends of said arms, whereby to turn the shafts jointly in opposite directions, and power operable means for turning said cam member, comprising a cylinder in fixed relation to said housing, and a piston working in said cylinder under fluid pressure and operatively connected with said cam member.

13. In a vehicle frame leveling apparatus, a housing, two shafts to be power oscillated extending from opposite sides of said housing to the opposite sides of said frame where they have connection with frame elevating and lowering means, cam follower arms on the inner ends of said shafts, a cylindrical cam member mounted on a cross-shaft in said housing between said arms and having operative engagement with the outer ends of said arms, whereby to turn the shafts jointly in opposite directions, and power operable means for turning said cam member, comprising two cylinders in fixed relation to said housing, and pistons working in said cylinders under fluid pressure and operatively connected with said cam member on opposite sides of said cross-shaft.

14. In a vehicle frame leveling apparatus, a housing, two shafts to be power oscillated extending from opposite sides of said housing and connected to frame elevating and lowering means on opposite sides of said frame, means separately supporting said shafts on said frame for rotation in coaxial relation to one another, said housing being in rotatable floating relation to said shafts, crossheads on the inner ends of said shafts, a cylindrical cam member mounted on a cross-shaft in said housing between said crossheads and having operative engagement with the outer ends of said crossheads, whereby to turn the shafts jointly in opposite directions, said cam in a neutral mid-position being in angularly spaced relation to both ends of said crossheads so as to permit predetermined free oscillation of said shafts independently of one another and of said cam member in the neutral position of the latter, the floating mounting of said housing permitting excess angular movement of either shaft by rotation of said housing sufficient to compensate for the excess, and power operable means for turning said cam member.

15. An apparatus as set forth in claim 14 wherein said housing is unbalanced and tends to gravitate to a certain position in which the cam member in neutral position has approximately the same angular spaced relationship to both ends of both crossheads, the structure including spring means yieldingly restraining rotation of said housing from its settled position and tending to return it to such position when moved from it.

16. In a vehicle frame leveling apparatus, a housing, two shafts to be power oscillated extending from opposite sides of said housing and connected to frame elevating and lowering means on opposite sides of said frame, crossheads on their inner ends, a cylindrical cam member mounted on a cross-shaft in said housing between said crossheads and movable from a neutral position in disengaged spaced relation to said crossheads to an operative position having operative engagement with the outer ends of said crossheads, whereby to turn the shafts jointly in opposite directions, radial bearings in said housing for opposite ends of said cross-shaft and an end thrust bearing for one end portion of said cross-shaft, and power operable means for turning said cam member.

17. In a vehicle frame leveling apparatus, a housing, two shafts to be power oscillated exsame approximately angular spaced relationship to both crossheads.

29. A structure as set forth in claim 3 wherein the housing is freely rotatable relative to said shafts as an axis and carries said power operable cam with it in such rotation so that a differential action is obtained in the power operation of said shafts for levelling, the structure including spring means yieldingly restraining rotation of said housing from a neutral position in which the cam has approximately the same angular spaced relationship to said crossheads.

30. A structure as set forth in claim 3 wherein the housing is freely rotatable relative to said shafts as an axis and carries said power operable cam with it in such rotation so that a differential action is obtained in the power operation of said shafts for levelling, said housing being unbalanced and tending to gravitate to a certain position in which the cam is in neutral position in the same approximately angular spaced relationship to both crossheads, the structure including spring means yieldingly restraining rotation of said housing from its gravitated position.

EDWARD RICHTER.

REFERENCES CITED

The following references are of record in the file of this patent:

UNITED STATES PATENTS

| Number | Name | Date |
| --- | --- | --- |
| 1,176,817 | Deming | Mar. 28, 1916 |
| 1,262,829 | Neumeier | Apr. 16, 1918 |
| 1,317,365 | Greenberg | Sept. 30, 1919 |
| 1,933,731 | Hanna | Nov. 7, 1933 |
| 1,933,908 | Hoppenstand | Nov. 7, 1933 |
| 2,000,230 | Heise | May 7, 1935 |
| 2,121,626 | Degelman | June 21, 1938 |
| 2,182,789 | Cotanch | Dec. 12, 1939 |
| 2,249,356 | Goodman | July 15, 1941 |
| 2,278,081 | Kramer | Mar. 31, 1942 |
| 2,324,587 | Krogh | July 20, 1943 |
| 2,365,387 | Briscoe | Dec. 19, 1944 |